July 16, 1968 R. BYE 3,392,960

TAPE REEL

Filed Jan. 12, 1966 2 Sheets-Sheet 1

Richard Bye

INVENTOR.

BY Clarence A. O'Brien
and Harvey B. Jacobson
Attorneys

July 16, 1968 R. BYE 3,392,960

TAPE REEL

Filed Jan. 12, 1966 2 Sheets-Sheet 2

Richard Bye
INVENTOR.

BY Clarence A. O'Brien
and Harvey B. Jacobson
Attorneys

United States Patent Office 3,392,960

Patented July 16, 1968

3,392,960

TAPE REEL

Richard Bye, 1316 M St. NE., Brainerd, Minn. 56401

Filed Jan. 12, 1966, Ser. No. 520,123

10 Claims. (Cl. 254—134.3)

ABSTRACT OF THE DISCLOSURE

A storage device for flexible tape including a rotatably mounted tape receiving pan into which the tape is introduced and from which the tape is drawn utilizing an elongated guide tube. The tape receiving pan is mounted within a housing which includes a pair of handles, one of which functions as a support in conjunction with a pair of movement resisting feet.

The present invention relates to new and useful improvements in storage devices of the type particularly adapted for receiving storing and dispensing spring tape such as electricians' fish tape or the like.

It is a primary object of the instant invention to provide a tape reel or storing device which is capable of accepting and properly storing, in a coil, spring tape of the type normally used by electricians, telephone men, etc. for pulling wire through conduits, pipes, ducts, or the like, which tape is normally exceedingly difficult to handle and store due to the nature thereof.

In conjunction with the above object, it is also a significant object of the instant invention to provide a storage device or reel from which the tape can be smoothly dispensed as needed without any danger of the tape uncoiling or springing from the device.

Further, it is a significant object of the instant invention to provide a storage reel which, in addition to safely accommodating the tape, is portable in nature and provides a protective enclosure about the coiled tape.

Also, it is an important object of the instant invention to provide a storage device wherein the tape can be stored through merely the pushing of the tape into the device, and dispensed by merely a direct pulling of the tape from the reel with the device itself restricting and retaining the tape in any position in the absence of a direct physical push or pull thereon.

Another significant object of the instant invention resides in providing a device which, although relatively small and completely portable in nature, can be stably positioned so as to effectively retain its location while both reeling and unreeling the tape so as to follow the user of the reel to manipulate the tape as desired.

Basically, in achieving the above objects, it is contemplated that the tape reel or storage device include an enlarged upwardly opening housing rotatably mounting an upwardly opening flat bottom pan therein. A tape guide, in the nature of a downwardly and inwardly reversely curving tube extends into the rotatably mounted pan from the exterior of the housing and is fixed relative to the housing. The tape guide receives the tape and directs the tape into the rotatably mounted pan with the introduced tape, through its tendency to lie straight and flat, effecting a tight engagement against the side wall of the pan and a consequent rotation of the pan upon a continued introduction of the tape. The guide is so orientated as to have the force of the introduced tape directed downwardly in a manner which tends to stabilize the storage device against movement with the gradual reversing bend in the guide exerting a slight frictional grip on the tape such as is sufficient so as to hold the tape in any position in the absence of a positive force thereon either pushing the tape into the rotating pan or withdrawing the tape therefrom. Various other significant features are also incorporated into the storage device, including a tape guard for preventing any accidental uncoiling of the tape, and a pair of handles, one of which additionally functions as a stabilizing leg for the housing.

These together with other objects and advantages which will be come subsequently apparent reside in the details of construction and operation as more fully hereinafter described and claimed, reference being had to the accompanying drawings forming a part hereof, wherein like numerals refer to like parts throughout, and in which:

Figure 1:
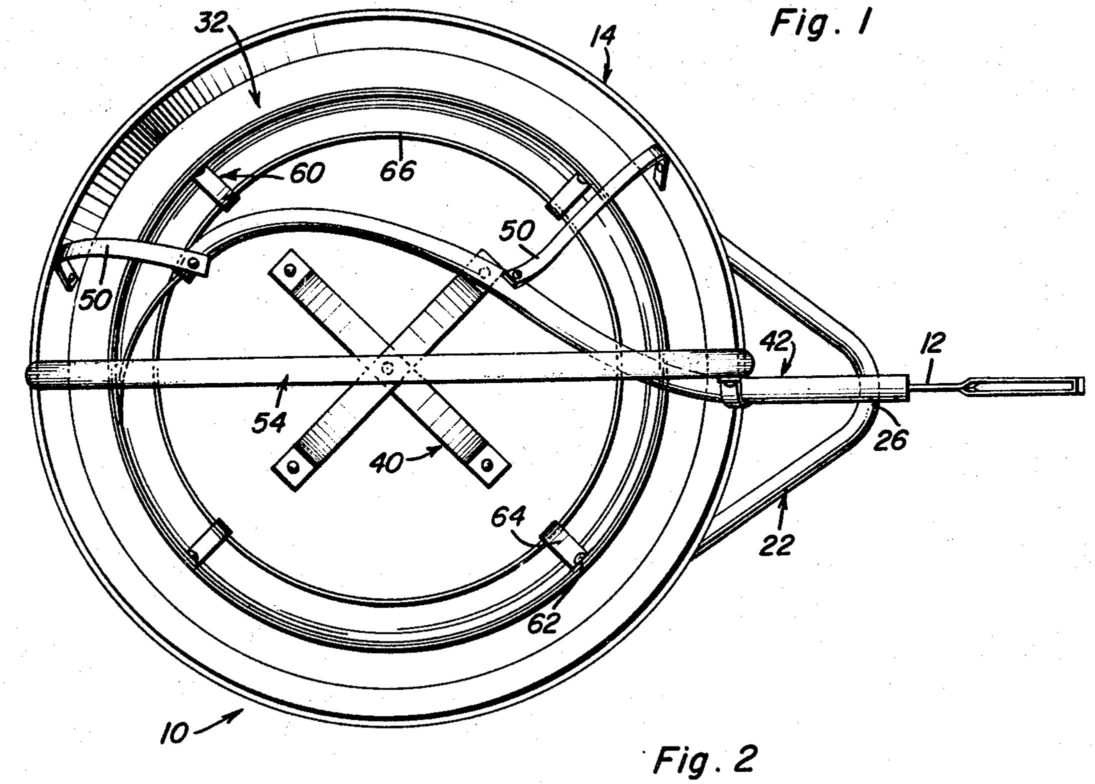
FIGURE 1 is a top plan view of the tape reel or storage device.
Figure 2:
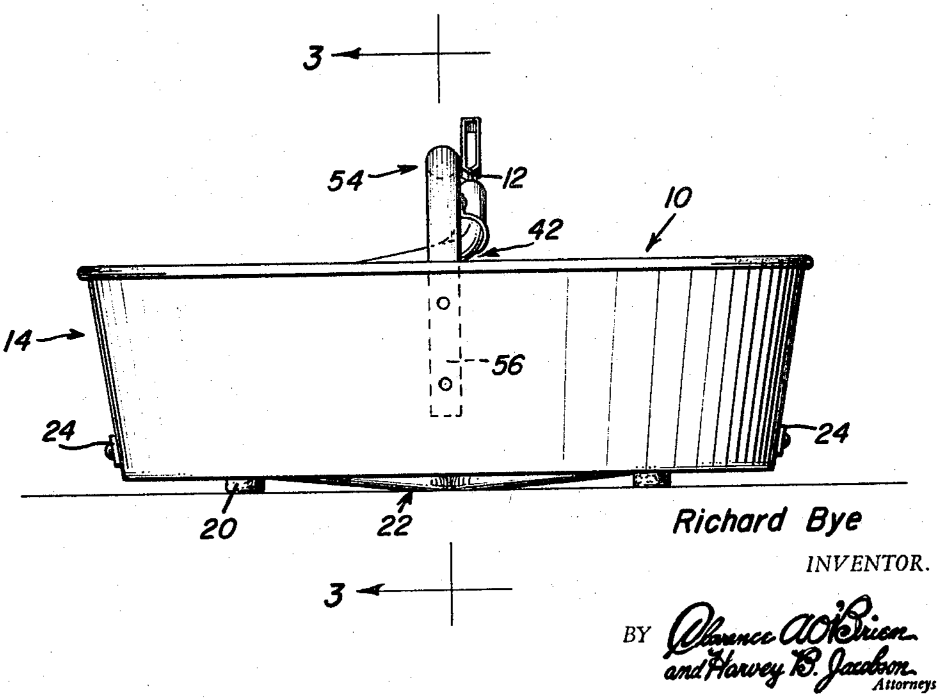
FIGURE 2 is an elevational view of the left hand side of the device as illustrated in FIGURE 1.
Figure 3:
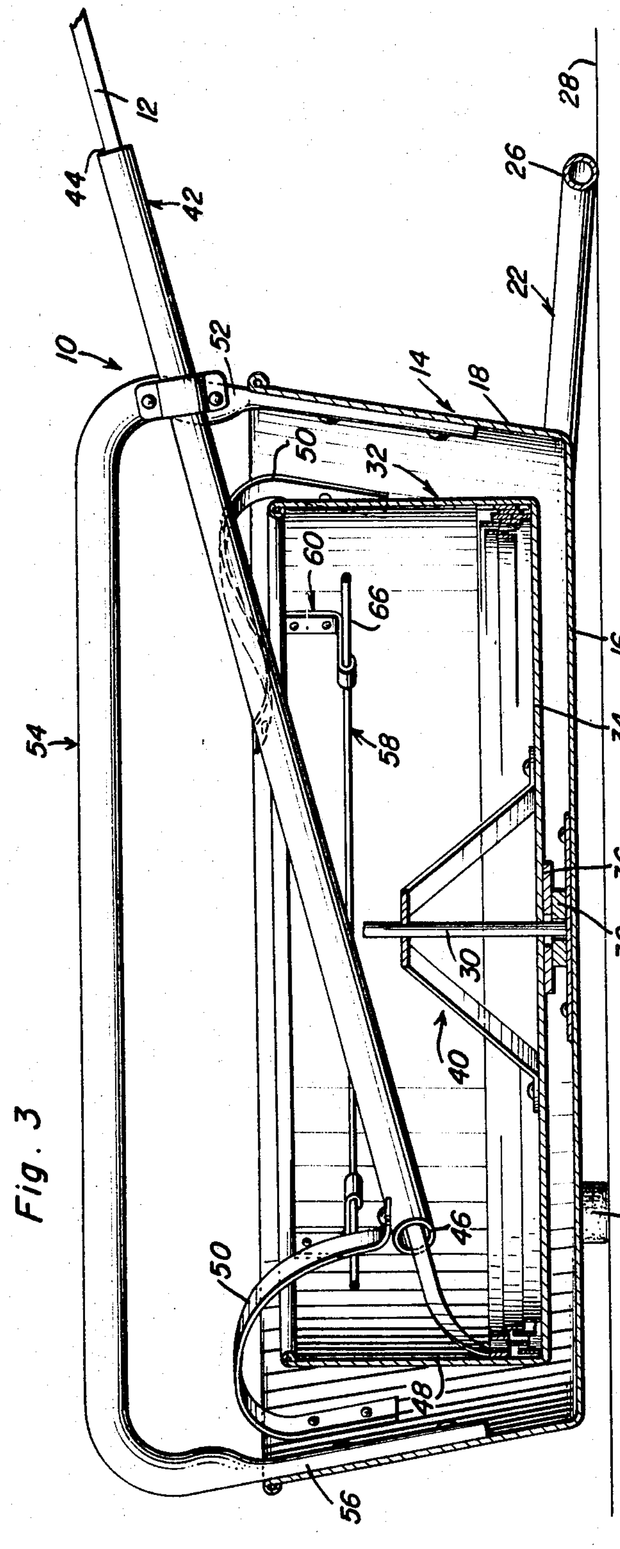
FIGURE 3 is an enlarged vertical cross-sectional view taken substantially on a plane passing along line 3—3 in FIGURE 2.
Figure 5:
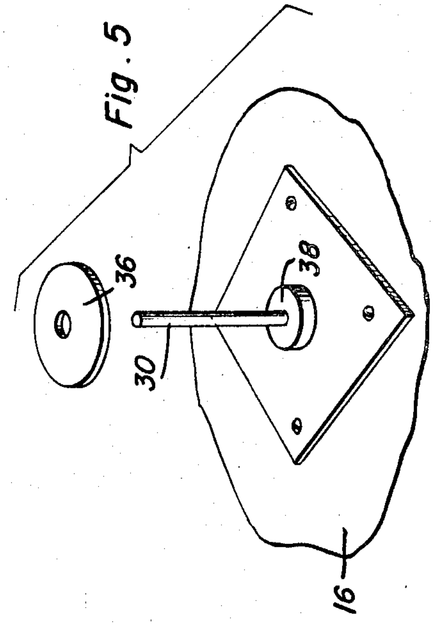
FIGURE 5 is an exploded perspective detail of the mount for the rotatable pan.
Figure 4:
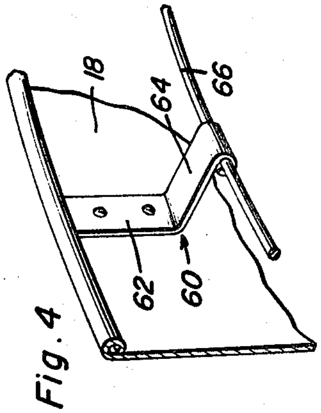
FIGURE 4 is a perspective detail of a portion of the tape guard.

Referring now more specifically to the drawings, reference numeral 10 is used to generally designate the storage device or reel comprising the instant invention, this device being particularly adapted for the accommodation of electricians' fish tape 12, or similar spring tapes. The device 10 includes an enlarged open top circular housing 14 having a flat bottom 16 and an upwardly and outwardly inclined circular wall 18. The housing 14 is to be supported in a slightly elevated position by means of a pair of rubber feet 20 transversely aligned at what might be considered the forward portion of the housing 14, and a rearwardly projecting generally U or V-shaped handle 22 having the free ends 24 thereof secured to the opposite sides of the housing 14. As will be best appreciated from FIGURE 3, the handle 22 extends rearwardly and downwardly so as to positon the bight portion 26 generally below the flat bottom 16 for engagement with a supporting surface 28 in a manner whereby, in conjunction with the rubber feet 20, a level positioning of the housing 14 is achieved. This handle 22 of course functions as a convenient means for both carrying the device 10 and supporting the device 10 from a wall hanger or the like either during storage or during use.

A rod-like shaft 30 is fixed centrally to the housing bottom 16 and projects vertically into the interior of the housing 14 for the reception of a rotatably mounted pan 32 thereon, the flat bottom wall 34 of the pan resting on a circular washer 36 which is in turn spaced, through spacer 38, above the bottom of the housing 14 for free rotation relative thereto. The pan 32 is stabilized on the shaft 30 by a pan support 40 consisting of a pair of upwardly peaked cross straps having a central shaft-accommodating aperture therethrough which in turn rotatably receives the shaft 30 and introduces a substantial degree of lateral stability to the pan 32 such as will be required during the introduction and discharge of the tape 12.

The tape 12 is to be introduced into the rotatably mounted pan 32 by means of an elongated tubular tape guide 42. This tape guide 42 is downwardly and inwardly inclined from a first outer end 44 located upwardly and outwardly of the housing 14 to the second inner end 4[illegible] located at approximately mid-height within the rotatably mounted pan 32 at a point generally adjacent the side wall 48 thereof. That portion of the guide 42 from the outer tape-introducing end 44 thereof to the adjoining housing wall 18 is straight and radially orientated in spaced relation and centered over the forwardly projecting supporting handle 22 which is in turn at approximately right angles to an imaginary line interconnecting the two front rubber feet 20. At the housing wall 18, the tape guide 42 gradually curves toward one side as it inclines downwardly into the rotating pan 32 with this curving portion of the tape guide 42 reversing itself and terminating at the tape discharging end 46 located just short of the point on the pan wall 48 diametrically opposed to the first radially extending portion of the guide 42, and inwardly of the wall 48 of the pan 32 in a manner whereby the discharging tape 12 will be encouraged about a circular path. The tube guide 42 is supported within and out of contact with the rotatably mounted pan 32 by a pair of hanger straps 50 secured to the inner face of the housing wall 18 at spaced points there along with these hanger straps 50 arching over the upper edge of the pan wall 48 and into the open top of the pan 32 where they are affixed to the tubular guide 42 so as to effect the support thereof without interference with the rotatable pan 32. In addition, the guide 42, at the point where it projects over the housing wall 18, is strapped directly to one vertical leg 52 of a second handle 54 which extends diametrically across the housing 14 and has a second generally vertical leg 56, both legs 52 and 56 being suitably affixed to the housing wall 18. This second handle 54 also provides a convenient means for handling the device 10, even during use of the device should circumstances dictate a movement of the device 10. Finally, a tape guard 58 is incorporated within the rotatably mounted pan 32 about the top thereof so as to prevent any dislocation or coiling up of the wound tape 12 into a tangled mass of steel tape. This guard 58 includes a plurality of angle members 60 having a first vertical leg 62 thereof affixed to the inner face of the pan wall 48, and a second horizontal leg 64 projecting inwardly into the pan 32. The inner ends of each of the horizontal legs of the right angle members 60 are in turn coiled about or otherwise connected to an annular rod 66 which stabilizes the horizontal leg 64 and assists in retaining the tape 12 should the coiled tape tend to move upwardly within the pan 32.

From the foregoing, it will be appreciated that a device has been defined wherein spring steel tape can be properly, quickly and conveniently stored by merely pushing the uncoiled tape into the inlet end 44 of the tape guide 42 with the tendency for the tape to lie straight and flat forcing the tape against the inner face of the pan wall 48 with this frictional engagement of the tape against the pan wall causing the pan to rotate as the tape is inserted, as well as when the tape is being removed. The shape and orientation of the tape guide 42 is deemed particularly significant in functioning so as to automatically position and coil the tape within the pan 32. The radially extending outer portion of the guide 42 forces the user of the tape to, when introducing the tape 12, direct the pressure of the introducing tape along the centerline of the device 10 in a manner which tends to keep the whole apparatus from moving, this movement being resisted by the two skid-preventing rubber feet 20 located on a line substantially at right angles to the line of the introduced tape and forward thereof. In addition, the downwardly directed inclination of the guide tends to result in a downward pressure being applied toward the rubber feet, this also tending to stabilize the unit without any extrinsic hold-down means. Finally, the gradual reversing bend defined by the major portion of the guide 42 causes a slight frictional gripping of the tape 12 in a manner which precludes any tendency for the tape 12 to move outwardly when not being held by the user, and requiring a positive physical movement on the tape so as to both introduce and withdraw the tape, thus providing in effect an automatic lock on the tape 12 upon a release thereof. Accordingly, it should be appreciated that a simple though highly novel means has been devised for effectively storing and controlling spring tape, such tape, because of the nature thereof, normally being extremely difficult to use, transport and store.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A tape storage device comprising a pan, said pan including a bottom and a circular peripheral wall, means mounting said pan for rotation about an axis coaxial with said wall, a tape guide, said tap guide having a first end located upward and radially outward from the pan wall, said guide projecting generally radially inward from said first end to a point above the pan wall, said guide continuing from said point downwardly into said pan along a curver path terminating in a second end located above the bottom of the pan out of contact with the pan and generally diametrically opposed from that portion of the wall over which the guide initially extends, a tape guard fixed to said pan wall and projecting inwardly peripherally thereabout above the second end of said tape guide, a housing, said housing including a bottom underlying the pan bottom in spaced relation thereto, said means mounting said pan for rotation being engaged between the pan bottom and the housing bottom for rotatably mounting said pan relative to said housing, movement restricting support means depending from said housing bottom along a line generally perpendicular to said tape guide and vertically below the second end of said guide, and handle means fixed to said housing and projecting radially outward therefrom generally paralleling the radially projecting portion of said tape guide, said handle means having an outer end portion projecting below the housing bottom a distance substantially equal to the support means and cooperating therewith for effecting a horizontal orientation of the housing.

2. The device of claim 1 wherein said housing includes a peripheral wall fixed to said housing bottom and surrounding said pan wall in outwardly spaced relation thereto, and guide positioning means engaged between said housing wall and said guide for supporting said guide within said pan and out of contact therewith so as to enable a rotation of said pan relative to said guide.

3. The device of claim 2 including second handle means extending diametrically over said pan and having the opposite end thereof fixed to said housing wall.

4. The device of claim 3 including means affixing said tape guide, outward of the pan wall, to said second handle means.

5. The device of claim 1 wherein said handle means is generally U-shaped, including a pair of leg portions secured to said housing and generally converging outwardly and slightly downwardly therefrom, the outer ends of said leg portions being interconnected by a transverse bight portion, said support means comprising a pair of laterally spaced feet secured to the housing bottom and depending therefrom so as to define, with the bight portion of said handle means, a three-point support for said tape storage device.

6. A tape storage device comprising tape receiving pan means, said pan means including a bottom and a peripheral wall projecting upward therefrom, means mounting said pan means for rotation about a central axis, an elongated tape guide, said tape guide having a first end opening outward of said pan means, said guide following a curved path terminating in a second end adjacent the peripheral wall above the bottom of the pan means, housing means, said housing means receiving said pan means and including a portion thereof underlying the pan means bottom in spaced relation thereto, said means for mounting said pan means for rotation being engaged between the pan means and the housing means, movement restricting support means depending from said housing means below said pan means, and handle means fixed to said housing means and projecting radially outward therefrom, said handle means having an outer end portion thereof projecting below the housing means a distance substantially equal to the support means and cooperating therewith for effecting a horizontal orientation of said housing means.

7. The device of claim 6 wherein the first end of said tape guide is located upward and outward of the peripheral wall, said peripheral wall being circular, said tape guide, between the outer first end thereof and the peripheral wall, extending substantially in a plane coinciding with a radius of the peripheral wall, said tape guide, within said peripheral wall continuing downwardly and terminating with the second end thereof generally diametrically opposed from the radially extending first end portion of said tape guide.

8. The device of claim 7 wherein said movement restricting support means comprise a pair of spaced feet affixed to said housing means along a line generally perpendicular to the tape guide and in opposed relation to said handle means.

9. A tape storage device comprising tape receiving pan means, said pan means including a bottom and a circular peripheral wall, means mounting said pan means for rotation about a central axis, an elongated tape guide, said tape guide having a first end thereof located upward and outward of said pan means wall in spaced relation thereto, said guide, from the first end thereof to approximately said wall, projecting in the plane of a radius of said circular wall whereby the force developed by a tape moving inwardly through said guide will act radially of the pan means, said guide, from approximately said peripheral wall, continuing downwardly into said pan means along a curved path terminating in a second end located above the bottom of the pan means out of contact with the pan means.

10. The device of claim 9 including housing means supporting said pan means, movement resisting support means depending from said housing means in generally diametric opposed relation to the first end portion of said tape guide, and handle means fixed to said housing means and projecting outwardly therefrom in general underlying relation to the projecting first end portion of said tape guide, said handle means having an outer end portion thereof positioned below the housing means a distance substantially equal to the support means and cooperating therewith for effecting a generally horizontal orientation of the housing means.

References Cited

UNITED STATES PATENTS

| | | | |
|---|---|---|---|
| 1,929,568 | 10/1933 | Spowart. | |
| 2,892,899 | 6/1959 | Connell -------- | 242—55.21 X |
| 2,957,643 | 10/1960 | Bosworth et al. ------ | 242—128 |
| 3,061,235 | 10/1962 | Lingle ------------- | 242—128 |

GEORGE F. MAUTZ, *Primary Examiner*.